United States Patent
Kato

(10) Patent No.: US 6,213,693 B1
(45) Date of Patent: Apr. 10, 2001

(54) TAPER TAPS FOR PIPE THREADS MADE OF HARD MATERIAL

(75) Inventor: Kazumi Kato, Toyokawa (JP)

(73) Assignee: OSG Corporation, Aichi (JP)

( * ) Notice: Subject to any disclaimer, the term of this patent is extended or adjusted under 35 U.S.C. 154(b) by 0 days.

(21) Appl. No.: 09/367,005

(22) PCT Filed: Oct. 19, 1998

(86) PCT No.: PCT/JP98/04741

§ 371 Date: Aug. 4, 1999

§ 102(e) Date: Aug. 4, 1999

(87) PCT Pub. No.: WO00/23219

PCT Pub. Date: Apr. 27, 2000

(51) Int. Cl.$^7$ .................................................. B23B 51/00
(52) U.S. Cl. ........................... 408/222; 408/215; 408/220; 470/198
(58) Field of Search .................. 408/215, 219, 408/220, 222; 470/198

(56) References Cited

U.S. PATENT DOCUMENTS

| | | | |
|---|---|---|---|
| 1,881,281 | * 10/1932 | Lamond | 408/220 |
| 2,145,819 | * 1/1939 | Swenson | 408/222 |
| 4,708,542 | 11/1987 | Emanuelli . | |
| 5,112,168 | * 5/1992 | Glimpel | 408/222 |
| 5,725,336 | * 3/1998 | Vilmanyi et al. | 408/219 |

FOREIGN PATENT DOCUMENTS

| | | |
|---|---|---|
| 4-111714 | 4/1992 | (JP) . |
| 3005740 | 10/1994 | (JP) . |
| 3005741 | 10/1994 | (JP) . |
| 7-60546 | 3/1995 | (JP) . |
| 8-508683 | 9/1996 | (JP) . |

* cited by examiner

*Primary Examiner*—A. L. Wellington
*Assistant Examiner*—Monica S. Carter
(74) *Attorney, Agent, or Firm*—Muramatsu & Associates

(57) ABSTRACT

A high durability taper tap for pipe threads which can cut threads in a pipe made of hard materials having hardness of approximately 50 HRC. The sum $\Sigma\gamma$ of the width angle of cutters is large, approximately 130°, thereby achieving high strength and rigidity are achieved. Since rake angle of the cutting edge $\alpha$ is approximately −20°, cutter angle $\beta$ defined by the rake face and the peripheral relief becomes more than 90° so that the strength and rigidity of a cutting edge are enhanced. In addition, since a taper of the bottom of flutes is in a ratio of 1/16, approximately equal to that of the thread portion, the rake angle $\alpha$ of all of the cutting edges 6 is uniform so that all of the cutting edges can equally cut the threads. Further, the diameter Df of the bottom of the flutes of the top end portion is approximately 60% of the smaller end of the thread portion, which is larger than that of the common tapping tool. Owing to this configuration, the taper tap for pipe threads having high strength, rigidity and hard wearing property can be achieved.

4 Claims, 3 Drawing Sheets

Fig. 3

| | | 1/8PT28 | 1/4PT19 | 3/8PT19 |
|---|---|---|---|---|
| Cutting Condition | Size of Screw | 1/8PT28 | 1/4PT19 | 3/8PT19 |
| | Material to be Cut | SKD11 54.0HRC | SKD11 56.0HRC | SKD11 55.0HRC |
| | Cutting Speed | 2.1m/min (70 min$^{-1}$) Standard Diameter Position | 2.1m/min (50 min$^{-1}$) Standard Diameter Position | 2.6m/min (50 min$^{-1}$) Standard Diameter Position |
| | Diameter of Bottom Hole | 8.22 ~ 8.23 × 20mm | 10.90 ~ 10.92 × 25mm | 11.41 ~ 11.44 × 30mm |
| | Thread Length | 13mm (Until Standard Diameter Position) | 21mm (Until Standard Diameter Position) | 21mm (Until Standard Diameter Position) |
| | Cutting Oil | Non Water-Soluble Cutting Oil (JIS 2-15) | | |
| | Machine | Standing Type Tapping Center | | |
| Cutting Performance | Taper Tap for Pipes 1 Present Invention | Usable after cutting 50 holes | Chamfer largely broken after cutting 35 holes Unusable further | Chamfer largely broken after cutting 35 holes Unusable further |
| | Taper Tap for Pipes(1) Conventional | Chamfer largely broken after cutting 2 holes Unusable further | Chamfer and complete thread portion largely broken after cutting 2 holes. Unusable further | Chamfer largely broken after cutting 2 holes Unusable further |
| | Taper Tap for Pipes(2) Conventional | Broken by trying to cut one hole | Broken by trying to cut one hole | Broken by trying to cut one hole |

TAPER TAPS FOR PIPE THREADS MADE OF HARD MATERIAL

FIELD OF THE INVENTION

This invention relates to a taper tap for pipe threads for cutting female threads, and more specifically, to a high durability taper tap for pipe threads which can cut female threads in a pipe having hardness of approximately more than 50 Rockwell C scales Hardness (HRC).

BACKGROUND OF THE INVENTION

A taper tap for pipe threads (hereinafter referred to as a "pipe taper tap") is a kind of hand taps and is used for cutting tapered female pipe threads for achieving an air tightness of the threads at the connecting portion of pipes, pipe components or fluid apparatuses. The pipe taper tap is different from a common tapping tool for forming triangle threads, for instance, in some respects. The main differences between these two are as follows. First, the pipe taper tap cuts the pipe threads by the thread portion of the tap tapered in a ratio of 1/16 in order to taper the pipe threads in a ratio of 1/16, while the common tapping tool cuts the threads only by the chamfer. Second, the pipe taper tap cuts the threads not only by the crest but also by the root of the thread in order to improve the air tightness of the pipe thread, while the common tapping tool does not cut the threads by the root of the thread.

As described above, since the cutting area of the pipe taper tap is larger than that of a common tapping tool, the cutting resistance of the pipe taper tap is larger than that of the common tapping tool. Therefore, it is impossible to cut threads in a pipe made of a hard material, such as the one after a heat treatment having hardness of 50 HRC or more, by using a pipe taper tap.

However, sometimes a heat treatment is mistakenly conducted on the material to be tapped before cutting female threads therein. Since such a material becomes hard after the heat treatment, the body of the pipe taper tap is crimped, broken, chipped or abraded in an early stage of use by merely cutting threads in one or two holes by the pipe taper tap. In such an event, the material after the heat treatment has to be abandoned or otherwise conducted an electrical discharge machining process on the material before cutting female threads therein. However, it is difficult to accurately cut threads after the electrical discharge machining. In addition, it takes more than several ten hours to conduct the overall process.

SUMMARY OF THE INVENTION

The present invention was made to solve the above described problems by providing a highly durable pipe taper tap for cutting threads in a pipe made of a hard material which is able to form female threads in a pipe having hardness of approximately 50 HRC or more.

In order to achieve the above object, the first invention of the pipe taper tap for a hard material is to form female threads in a pipe made of hard material, wherein a sum of a width angle of each cutter is set approximately from 110° to 150°, a rake angle of the cutting edge is set approximately from −25° to −10°, a diameter of top end portion at the bottom of the flute is set approximately from 58% to 68% of a diameter of the smaller end of the thread portion, and a taper ratio at the bottom of the flute is set approximately from 1/21 to 1/11.

According to the pipe taper tap of the first invention for cutting threads in a pipe made of a hard material, the sum of the width angle of the cutter is set approximately from 110° to 150°. The larger the sum of the width angle of the cutters, the broader it becomes the width of each of the cutters, and accordingly, the chipping or breaking of the thread portions of the cutter are reduced. On the other hand, if the width of the cutter becomes broader, the contacting area between the tap and the material to be cut becomes larger, causing not only grating sounds when cutting but also a large cutting resistance, which makes the cutting itself difficult. Therefore, in the present invention, taking into consideration of these factors, the sum of the width angle of the cutters is determined to be approximately from 110° to 150°.

The rake angle of the cutting edge is set approximately from −25° to −10°. The smaller the rake angle of the cutting edge (larger in minus values), the larger it becomes the cutter angle defined by the rake face and the peripheral relief, thereby improving the strength and rigidity of the cutting edge, which is able to prevent the breaking or chipping of the cutters. On the other hand, the larger the cutter angle, the larger it becomes the cutting resistance. The taper tap must cut the pipe threads not only at the crest but also at the root of the thread. Therefore, in order to improve the strength of the cutter, the rake angle of the cutting edge is set approximately from −25° to −10° by taking into consideration of these factors.

A diameter of the bottom of flutes at the top end portion is set approximately from 58% to 68% of a diameter of the smaller end potion of the thread portion and is formed larger than that of a common tapping tool. Therefore, the strength of the tap is improved to that extent and the tap is prevented from being broken. If the diameter of the bottom of the flute at the top end portion is formed larger, the sectional area of the flute becomes smaller and consequently chip packing tends to be caused. However, as explained above, since the rake angle of the cutting edge is set approximately from −25° to −10°, the chips are cut in relatively small pieces in a sheared shape. Therefore, even if the sectional area of the flute is small, chip packing can be effectively avoided.

Further, the bottom of the flute is tapered approximately in a ratio from 1/21 to 1/11. Since taper at the thread portion is set in a ratio of 1/16 according to the Japanese Industrial Standard (JIS) specification, the rake angle of the cutting edge from the smaller end to the larger end can be set approximately equally. Since the pipe taper tap of the present invention cuts the pipe threads by using all of the cutters, by setting the rake angle of all of the cutting edges approximately the same, all of the cutters can cut the pipe threads in the same manner.

The pipe taper tap of the second invention for cutting threads in a pipe made of a hard material comprises the taper tap for a hard pipe of the first invention, wherein the number of flutes provided therewith is five or more.

The pipe taper tap of the second invention for cutting threads in a pipe made of a hard material functions in a manner equivalent to the pipe taper tap of the first invention. In addition, the sectional area of the flute for ejecting the chips is set small by forming the diameter of the bottom of the flutes within approximately from 58% to 68% of the diameter of the smaller end of the thread portion. However, since the number of the flutes provided with the taper tap is large, such as five or more, ejection of the chips is smoothly performed, thereby avoiding an increase of the cutting resistance because of jamming of chips. Also, by providing five or more flutes with the taper tap, the cutting amount per cutting edge becomes small, thereby decreasing a cutting load for each cutting edge.

The pipe taper tap of the third invention for cutting threads in a pipe made of a hard material comprises the pipe taper tap of the first or second invention, wherein the rake angle of the cutters is set approximately −20°, the diameter of the bottom of the flute at the top end of the tap is set approximately 60% of the thread portion, the number of the flutes is five and the taper of the bottom of the flutes is made approximately identical to that of the thread portion. By forming the taper at the bottom of the flute approximately equal to that of the thread portion, the rake angle of the cutting edges from the small end to the large end may be set approximately the same. Therefore, it becomes possible for all of the cutting edges to perform the cutting in the same manner.

BRIEF DESCRIPTION OF THE DRAWINGS

FIG. 3 is a table comparing the durability of the pipe taper tap of the embodiment of the present invention with durability of the conventional examples (1) and (2) of pipe taper taps.

EXPLANATION OF REFERENCE CHARACTERS

Figure 1:
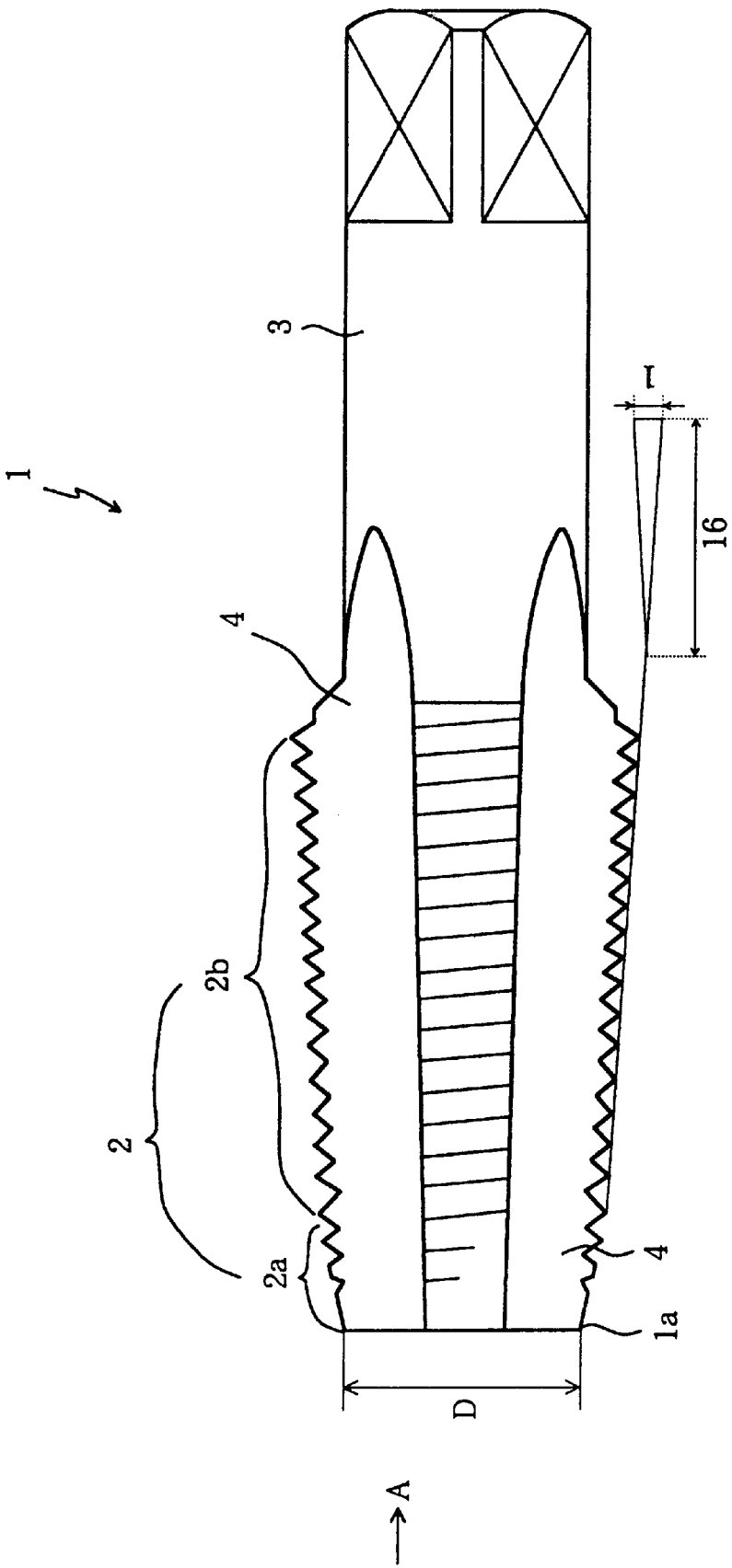
FIG. 1 is a front view of the pipe taper tap for cutting threads in a pipe made of a hard material showing an embodiment of the present invention.

1 Pipe taper tap for threads of hard material
1a Top end portion
2 Thread portion
2a Chamfer
2b Complete thread portion
4 Flute land cutting edge
8 Cutting face
α Rake angle
β Cutter angle
γ Width angle of cutters
D Outside diameter of smaller end of thread
Df Diameter of bottom of flute at top end portion
O Axial center

DETAILED DESCRIPTION OF PREFERRED EMBODIMENTS

The preferred embodiment of the present invention is explained with reference to the attached drawings.

FIG. 1 is a front view of the taper tap for pipe threads made of a hard material for showing an embodiment of the present invention, namely a taper tap for pipes made of a hard material (hereinafter merely referred to as a "pipe taper tap").

The pipe taper tap 1 is comprised of a thread portion 2 at the side of the top end 1a and a shank portion 3 at the side of the back end portion. A chamfer portion 2a having two and a half crests is provided at the top end of the thread portion 2. A complete thread portion 2b tapered in a ratio of 1/16 is provided at the back end of the chamfer portion 2a. Here, a taper ratio 1/16 is defined by a ratio between a vertical length "1" and a horizontal length "16" as shown in FIG. 1. The complete thread portion 2b is formed continuously with the chamfer 2a. Five straight flutes for ejecting the chips are provided at the thread portion 2 in the axial direction of the pipe taper tap 1. At an outer surface of the thread portion 2, each flute 4 is evenly located with an interval of about 72°. The bottom of the flute is tapered in a ratio of 1/16, which is the same as that of the complete thread portion 2b.

Figure 2:
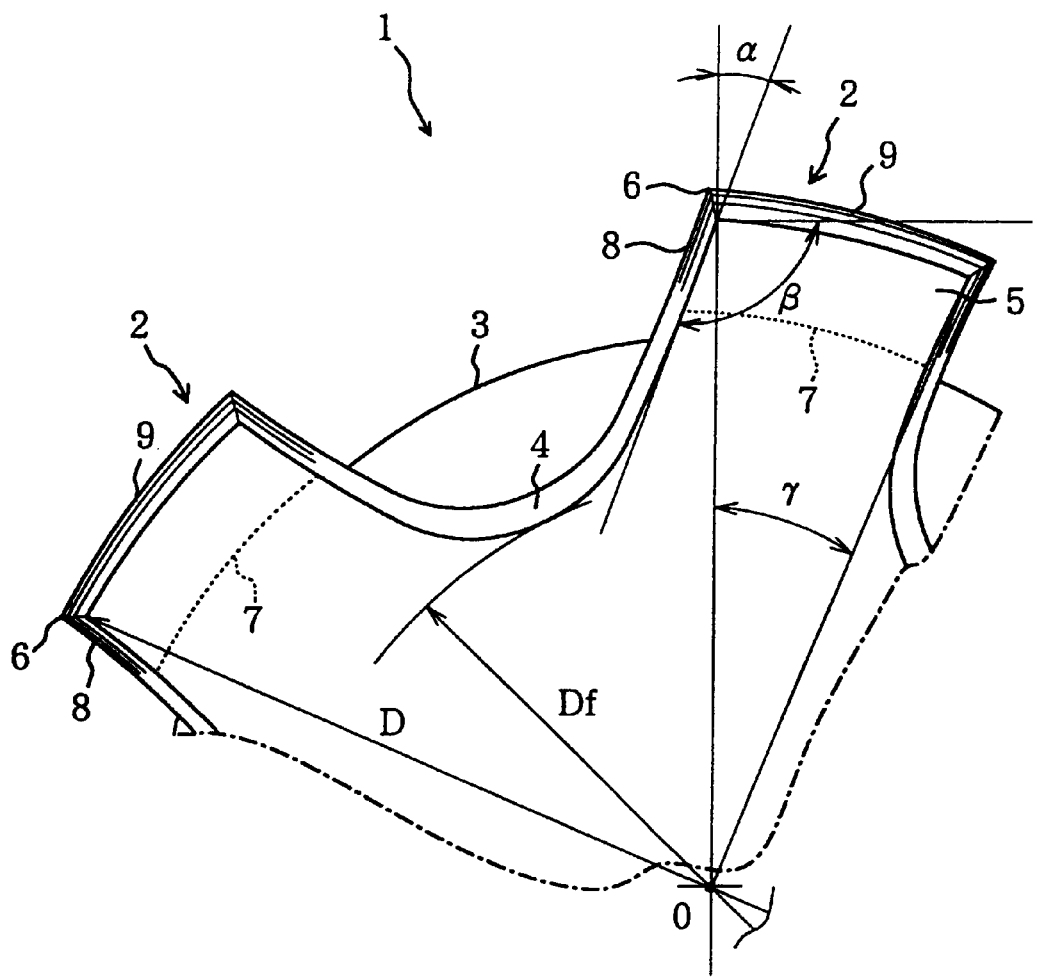
FIG. 2 is a partial expanded view of the pipe taper tap shown in FIG. 1 viewed from the direction indicated by the arrow A in FIG. 1.

FIG. 2 is a partial expanded view of the pipe taper tap 1 as shown in FIG. 1 viewed from the direction indicated by the arrow A of FIG. 1. As shown in FIG. 2, the thread portion 2 of the taper tap 1 are divided into five lands 5 by five flutes 4. The width of each land 5 (width of the cutter) is equal to each other. The sum the central angle γ (cutter width angle) Σγ is set to approximately 130°. A cutting edge 6 is provided at the end portion of each land 5. The rake angle α of the cutting edge 6 is set at approximately −20°. Further, the diameter Df of the bottom of the flutes at the top end portion 1a is formed such that the ratio Rd (%) with respect to the diameter D at the smaller end of the thread portion 2, namely (Df/D)×100, is approximately 60%. The surface of the thread portion 2 is coated by titanium carbon nitride (TiCN). The broken line 7 of FIG. 2 shows the root of the thread.

Since the pipe taper tap 1 is formed of a super fine and hard alloy coated by the titanium carbon nitride (TiCN), it possess an excellent hard wearing properties against a hard material to be cut. Further, although five flutes are provided with the tap, the sum of the width angle Σγ of the cutters is relatively largely set, approximately 130°, high strength and rigidity of the tap are achieved by the increased width of each cutter. By this arrangement, chipping or breaking of the thread portion 2 is prevented. The broader the width of each cutter, the larger it becomes the contacting area between the tap and the material to be cut, causing grating sounds in the course of cutting as well as increasing the cutting resistance. Taking these factors into consideration, the sum of the angle of the width of cutters Σγ is set to approximately 130°.

Since the rake angle α of the cutting edge 6 is set at approximately −20°, the cutter angle β defined by the cutting face 8 and the peripheral relief 9 becomes greater than 90°. Therefore, the strength and rigidity of the cutting edge 6 is improved and accordingly, breaking or chipping of the cutter is prevented. In addition, since the taper at the bottom of the flute 4 is set in the ratio of 1/16 which is the same taper ratio as that of the thread portion 2, the rake angle α of the cutting edge 6 from the smaller end to the larger end of the thread portion 2 becomes equal. Since the pipe taper tap 1 cuts the threads by all of the cutting edges 6, the rake angle α of all of the cutting edges 6 is set equal to each other so that all of the cutting edges 6 can equally cut the threads.

As described above, if the cutter angle β becomes large, the strength and rigidity of the cutting edge 6 are improved, on the other hand, the cutting resistance becomes large. Therefore, it becomes difficult to cut the threads. In addition, the pipe taper tap 1 needs to cut the threads by the root 7 of the thread. Therefore, taking these factors into consideration, the rake angle α of the cutting edge 6 is set to approximately −20°.

The diameter Df of the bottom of the flute of the top end portion 1a of the pipe taper tap 1 is set approximately 60% of the diameter D of the smaller end of the thread portion 2. The diameter Df is set larger than that of the common tapping tool. Therefore, the strength and rigidity of the tap is improved and the pipe taper tap 1 is prevented from being broken to that extent.

The larger the ratio of the diameter Df of the bottom of the flutes of the top end portion 1a relative to the diameter D of the smaller end of the thread portion 2, the smaller it becomes the sectional area of the flutes 4, thereby causing chip packing in the flutes 4. However, as described in the foregoing, in the present invention, since the rake angle α is approximately −20°, the chips are cut into relatively small pieces in a sheared shape. In addition, since the number of the flutes 4 provided for ejecting the chips is five, which is larger than that of the common tapping tool, the cutting chips are ejected smoothly and the chip jamming is effectively prevented. Also, by providing five of the flutes 4, which is larger in number than that of the common tapping tool, the cutting amount of each cutter of the chamfer 2a becomes small and accordingly the cutting load against each cutter 6 at cutting is reduced.

FIG. 3 shows the comparison of the durability of the pipe taper taps when conducting cutting process of a hard material having a hardness of approximately 50 HRC by using the pipe taper tap 1 of the present invention and the conventional pipe taper taps (1) and (2). As shown in FIG. 3, the conventional pipe taper taps (1) and (2) were damaged and become unusable by cutting female threads for only one or two holes in the pipe made of a hard material having hardness of 54.0 HRC. However, the pipe taper tap 1 of the present invention was able to cut threads in 35 holes in the pipe made of a hard material having hardness of 55.0 HRC and 56.0 HRC, and in 50 holes or more made of a hard material having hardness of 54.0 HRC.

According to the pipe taper tap 1 of the embodiment of the present invention, excellent strength, rigidity and hard wearing property are achieved and the increase of the cutting resistance caused by chip packing is prevented. Therefore, it becomes possible to cut highly accurate pipe threads made of a hard material, such as a material to be cut after a heat treatment, having hardness of, for instance, approximately 50 HRC or more while maintaining a sufficient durability.

Foregoing is the explanation of the present invention based on the embodiment as described above. However, the present invention is not limited to the above described embodiment. It is obvious that various modifications can be made within the scope and gist of the present invention. For example, the taper tap of the present invention is not limited to the application of forming threads on the pipes but can be used in forming threads on mechanical components or bodies.

According to the embodiment of the present invention, the sum of the width angle of the cutter Σγ is set approximately 130°, the rake angle α of the cutting edge 6 is set approximately −20°, the diameter Df of the bottom of flutes at the top end portion is set approximately 60% of the diameter D of the smaller end of the thread portion 2, the number of the flutes 4 for ejecting the chips is five and the taper of the bottom of the tap is set approximately equal to the taper of the thread portion 2. However, the embodiment of the present invention is not limited to these values. The taper tap of the present invention can be produced by, for instance, setting the sum of the width of the cutter Σγ to approximately in a range from 110° to 150°, the rake angle α of the cutting edge 6 in a range approximately from −10° to −25°, the diameter Df of the bottom of the flute at the top end portion 1a to approximately in a range from 58% to 68% of the diameter D of the smaller end of the thread portion 2 and the number of the flutes 4 for ejecting chips five or more, and the taper of the bottom approximately from 1/21 to 1/11. By setting each of the values properly depending upon the taper female threads to be cut, the pipe taper tap having a sufficient durability against a hard material having hardness of approximately more than 50 HRC for practical use can be achieved.

According to the pipe taper tap of the first invention for cutting threads in a pipe made of a hard material, by setting up the values of the sum of width angle of cutters, the rake angle of the cutting edges, the diameter of the bottom of the flute at the top end of the tap and the taper at the bottom of the flute within the predetermined range noted above, the pipe taper tap having a sufficient durability for cutting threads in a pipe made of a hard material, such as a material after a heat treatment having hardness of approximately more than 50 HRC, can be produced.

According to the pipe taper tap of the second invention for cutting threads in a pipe made of a hard material, in addition to the effect of the first invention above, the ejection of the chips is smoothly conducted so that the increase of cutting resistance owing to the chip jamming is avoided by increasing the number of the flutes up to five or more. Further, by providing five or more flutes, the load against each cutting edge is reduced to improve the durability of the cutters by reducing the cutting amount of each cutter.

According to the pipe taper tap of the third invention for cutting threads in a pipe made of a hard material, in addition to the effects of the first and second invention noted above, the durability of the pipe taper tap for cutting threads made of a hard material is further improved by setting the rake angle of the cutting edge to approximately −20°, the diameter of the bottom of the top end portion to approximately 60% of that of the smaller end of the thread portion, the number of the flutes at five, and the taper of the bottom of the flutes approximately equal to that of the thread portion.

What is claimed is:

1. A taper tap for pipe threads for cutting female threads made of hard material, wherein:

a sum of a width angle of cutters is in a range approximately from 110° to 150°, a rake angle of a cutting edge is in a range approximately from −25° to −10°, a diameter of bottom of flutes at a top end portion is in a range approximately from 58% to 68% of a diameter of a smaller end of a thread portion, and a taper ratio of the bottom of the flutes is in a range approximately from 1/21 to 1/11.

2. A taper tap for pipe threads for cutting female threads made of hard material as described in claim 1, wherein the number of the flutes is five or more.

3. A taper tap for pipe threads for cutting female threads made of hard material as described in claim 1, wherein the rake angle of the cutting edge is approximately −20°, the diameter of the bottom of the flutes at the top end portion is approximately 60% of the smaller end of the thread portion, the number of the flutes is five and the taper ratio of the bottom of the flutes is approximately equal to that of the thread portion.

4. A taper tap for pipe threads for cutting female threads made of hard material as described in claim 2, wherein the rake angle of the cutting edge is approximately −20°, the diameter of the bottom of the flutes at the top end portion is approximately 60% of the smaller end of the thread portion, the number of the flutes is five and the taper ratio of the bottom of the flutes is approximately equal to that of the thread portion.

* * * * *